US012626458B2

(12) United States Patent
Peruch et al.

(10) Patent No.: US 12,626,458 B2
(45) Date of Patent: May 12, 2026

(54) USER INTERFACE FOR ADJUSTING BOUNDING BOX DIMENSIONS IN CONTACTLESS MEASUREMENT DEVICE

(71) Applicant: QBOID, INC., San Jose, CA (US)

(72) Inventors: Francesco Peruch, Sunnyvale, CA (US); Davide Zanella, Padua (IT)

(73) Assignee: QBOID, INC., San Jose, CA (US)

( * ) Notice: Subject to any disclaimer, the term of this patent is extended or adjusted under 35 U.S.C. 154(b) by 51 days.

(21) Appl. No.: 18/603,966

(22) Filed: Mar. 13, 2024

(65) Prior Publication Data

US 2024/0312134 A1      Sep. 19, 2024

Related U.S. Application Data

(60) Provisional application No. 63/453,039, filed on Mar. 17, 2023.

(51) Int. Cl.
*G06T 17/00* (2006.01)
*G06F 3/04847* (2022.01)
*G06T 7/11* (2017.01)
*G06V 10/25* (2022.01)

(52) U.S. Cl.
CPC .......... *G06T 17/00* (2013.01); *G06F 3/04847* (2013.01); *G06T 7/11* (2017.01); *G06V 10/25* (2022.01); *G06T 2207/20104* (2013.01)

(58) Field of Classification Search
None
See application file for complete search history.

(56) References Cited

U.S. PATENT DOCUMENTS

| | | | | |
|---|---|---|---|---|
| 10,706,457 | B2 * | 7/2020 | Damy ................. | G06F 3/04845 |
| 2021/0123717 | A1 * | 4/2021 | Wierda ...................... | G06T 7/70 |
| 2021/0407116 | A1 * | 12/2021 | Christensen .............. | G06T 7/73 |
| 2022/0309697 | A1 * | 9/2022 | Oh ............................ | G06T 7/60 |
| 2022/0358668 | A1 * | 11/2022 | Vaidya ...................... | G06T 7/12 |

* cited by examiner

*Primary Examiner* — Jeffrey J Chow

(74) *Attorney, Agent, or Firm* — WOMBLE BOND DICKINSON (US) LLP

(57) ABSTRACT

An object dimensioning device includes: a depth reconstruction system; a display device; and a processor and memory storing instructions that, when executed by the processor, cause the processor to: control the depth reconstruction system to capture a three-dimensional representation of a scene; segment a plurality of points from the three-dimensional representation of the scene, the plurality of points corresponding to an object in the scene; display a proposed bounding box on the display device and a plurality of user interface controls configured to adjust locations of corresponding faces of the proposed bounding box; receive an input through the plurality of user interface controls to adjust a position of a corresponding face of the proposed bounding box; display the proposed bounding box with the position of the corresponding face of the proposed bounding box adjusted in accordance with the input; and display dimensions of the proposed bounding box on the display device.

18 Claims, 10 Drawing Sheets

FIG. 1C

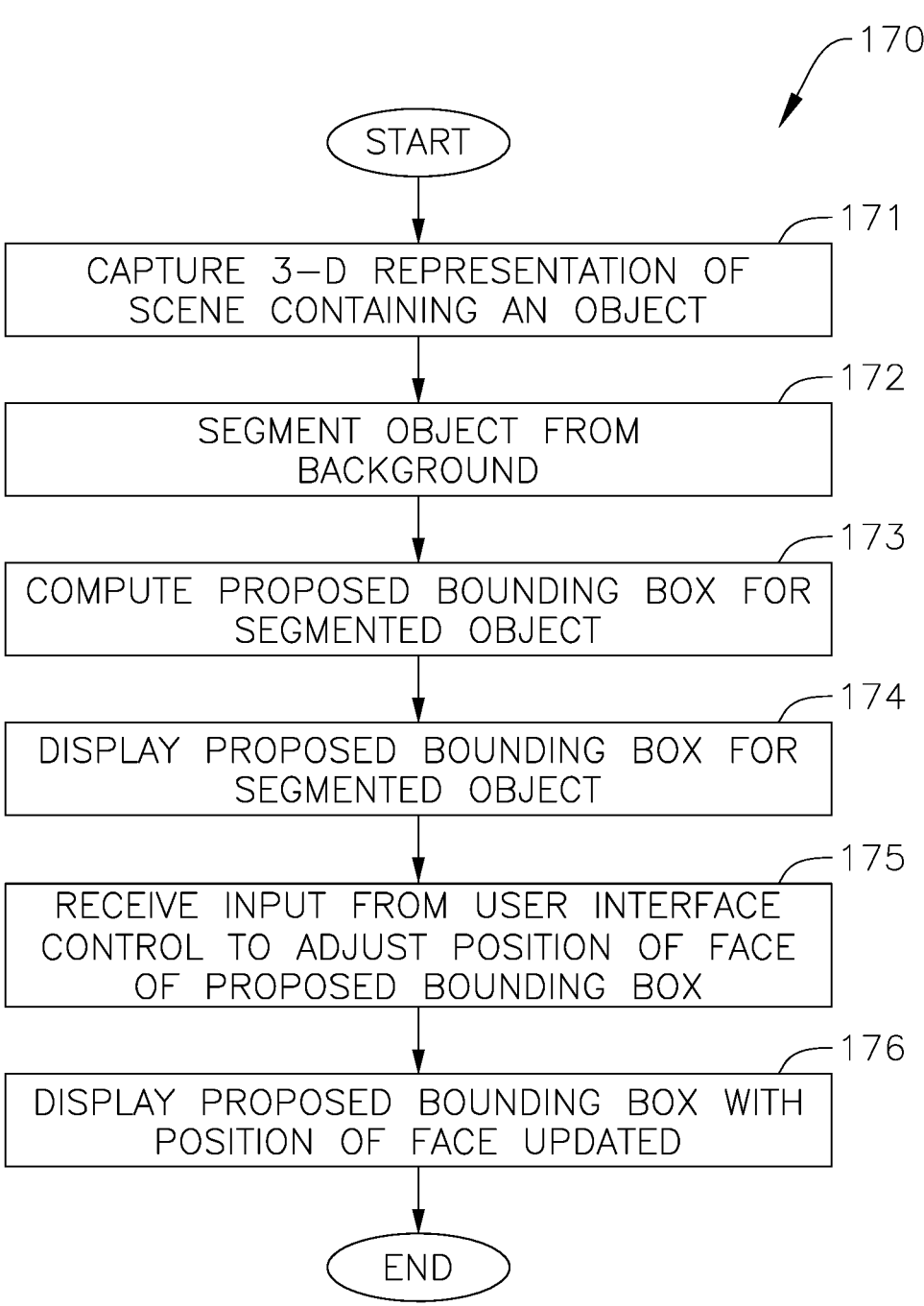

170

START

171
CAPTURE 3-D REPRESENTATION OF SCENE CONTAINING AN OBJECT

172
SEGMENT OBJECT FROM BACKGROUND

173
COMPUTE PROPOSED BOUNDING BOX FOR SEGMENTED OBJECT

174
DISPLAY PROPOSED BOUNDING BOX FOR SEGMENTED OBJECT

175
RECEIVE INPUT FROM USER INTERFACE CONTROL TO ADJUST POSITION OF FACE OF PROPOSED BOUNDING BOX

176
DISPLAY PROPOSED BOUNDING BOX WITH POSITION OF FACE UPDATED

END

300

310

312

320

L: 62.9     W: 22.6     H: 6.1     IN

WEIGHT          LB          IRREGULAR

FRGL     BATT     HAZMAT     OVPK

PROPOSAL A    PROPOSAL C

USER INTERFACE FOR ADJUSTING BOUNDING BOX DIMENSIONS IN CONTACTLESS MEASUREMENT DEVICE

CROSS-REFERENCE TO RELATED APPLICATION(S)

This application claims the benefit of U.S. Provisional Patent Application No. 63/453,039, filed in the U.S. Patent and Trademark Office on Mar. 17, 2023, the entire disclosure of which is incorporated by reference herein.

FIELD

Aspects of embodiments of the present disclosure relate to user interfaces and methods associated therewith for a contactless measurement device. In more detail, some aspects relate to user interfaces for measuring the dimensions of an object and adjusting the dimensions of a proposed bounding box representing the measured dimensions of the object.

SUMMARY

According to one embodiment of the present disclosure, an object dimensioning device includes: a depth reconstruction system; a display device; and a processor and memory storing instructions that, when executed by the processor, cause the processor to: control the depth reconstruction system to capture a three-dimensional representation of a scene; segment a plurality of points from the three-dimensional representation of the scene, the plurality of points corresponding to an object in the scene; compute a proposed bounding box around the plurality of points; display the proposed bounding box on the display device and a plurality of user interface controls configured to adjust locations of corresponding faces of the proposed bounding box, the user interface controls being displayed separately from the proposed bounding box; receive an input through a control of the plurality of user interface controls to adjust a position of a corresponding face of the proposed bounding box; display the proposed bounding box with the position of the corresponding face of the proposed bounding box adjusted in accordance with the input; and display dimensions of the proposed bounding box on the display device.

The user interface controls may include: a first line segment corresponding to a length dimension of the proposed bounding box; a second line segment corresponding to a width dimension of the proposed bounding box, and a third line segment corresponding to a height dimension of the proposed bounding box, and the input may include adjusting a position of a handle at an end of the first line segment and wherein the corresponding face is a face at an end of the proposed bounding box along the length dimension.

Relative lengths of the first line segment, the second line segment, and the third line segment respectively correspond to relative lengths of a length, a width, and a height of the proposed bounding box.

The user interface controls may include: a first pair of sliders configured to control a first pair of faces at opposite ends of a length dimension of the proposed bounding box; a second pair of sliders configured to control a second pair of faces at opposite ends of a width dimension of the proposed bounding box; and a third pair of sliders configured to control a third pair of faces at opposite ends of a height dimension of the proposed bounding box, and a handle of a slider of the first pair of sliders may be constrained to move along one dimension of the display device, dragging the handle of the slider of the first pair of sliders in a first direction along the one dimension of the display device may cause the corresponding face of the first pair of faces to move in a first direction along the length dimension of the proposed bounding box, and dragging the handle of the slider of the first pair of sliders in a second direction along the one dimension may cause the corresponding face of the first pair of faces to move in a second direction opposite the first direction along the length dimension of the proposed bounding box.

A speed at which the corresponding face moves is controlled by a distance that the handle of the slider is dragged along the first direction.

The user interface controls may include: a first pair of scrolling controls configured to control a first pair of faces at opposite ends of a length dimension of the proposed bounding box; a second pair of scrolling controls configured to control a second pair of faces at opposite ends of a width dimension of the proposed bounding box; and a third pair of scrolling controls configured to control a third pair of faces at opposite ends of a height dimension of the proposed bounding box, scrolling a first scrolling control of the first pair of scrolling controls may cause a corresponding face of the first pair of faces to move in a direction corresponding to a direction of the scrolling.

The memory may further store instructions that, when executed by the processor, cause the processor to: compute a plurality of proposed locations for a face of the proposed bounding box in accordance with confidence scores of locations of the face computed based on discontinuities detected in the scene; and present the plurality of proposed locations for the face of the proposed bounding box.

The memory may further store instructions that, when executed by the processor, cause the processor to present the plurality of proposed locations for the face of the proposed bounding box by providing user feedback in response to user input received via the plurality of user interface controls.

The memory may further store instructions that, when executed by the processor, cause the processor to display a rectilinear projection of the proposed bounding box and the three-dimensional representation of the scene.

The object dimensioning device may further include a network adapter, the memory may further store instructions that, when executed by the processor, cause the processor to transmit the dimensions of the proposed bounding box through a computer network using the network adapter.

According to one embodiment of the present disclosure, a non-transitory computer-readable medium stores instructions that, when executed by a processor, cause the processor to: receive a three-dimensional representation of a scene captured by a depth reconstruction system; segment a plurality of points from the three-dimensional representation of the scene, the plurality of points corresponding to an object in the scene; compute a proposed bounding box around the plurality of points; display the proposed bounding box in a user interface and a plurality of controls configured to adjust locations of corresponding faces of the proposed bounding box, the user interface controls being displayed separately from the proposed bounding box; receive an input through a control of the plurality of controls to adjust a position of a corresponding face of the proposed bounding box; display the proposed bounding box with the position of the corresponding face of the proposed bounding box adjusted in accordance with the input; and display dimensions of the proposed bounding box in the user interface.

The controls may include: a first line segment corresponding to a first dimension of the proposed bounding box; a second line segment corresponding to a second dimension of the proposed bounding box, and a third line segment corresponding to a third dimension of the proposed bounding box, and the input may include adjusting a position of a handle at an end of the first line segment and wherein the corresponding face is a face at an end of the proposed bounding box along the first dimension.

Relative lengths of the first line segment, the second line segment, and the third line segment may respectively correspond to relative lengths of a length, a width, and a height of the proposed bounding box.

The controls may include: a first pair of sliders configured to control a first pair of faces at opposite ends of a first dimension of the proposed bounding box; a second pair of sliders configured to control a second pair of faces at opposite ends of a second dimension of the proposed bounding box; and a third pair of sliders configured to control a third pair of faces at opposite ends of a third dimension of the proposed bounding box, a handle of a slider of the first pair of sliders may be constrained to move along one dimension of the user interface, dragging the handle of the slider of the first pair of sliders in a first direction along the one dimension of the user interface may cause the corresponding face of the first pair of faces to move in a first direction along the first dimension of the proposed bounding box, and dragging the handle of the slider of the first pair of sliders in a second direction along the one dimension may cause the corresponding face of the first pair of faces to move in a second direction opposite the first direction along the first dimension of the proposed bounding box.

A speed at which the corresponding face moves is controlled by a distance that the handle of the slider is dragged along the first direction.

The controls may include: a first pair of scrolling controls configured to control a first pair of faces at opposite ends of a first dimension of the proposed bounding box; a second pair of scrolling controls configured to control a second pair of faces at opposite ends of a second dimension of the proposed bounding box; and a third pair of scrolling controls configured to control a third pair of faces at opposite ends of a third dimension of the proposed bounding box, scrolling a first scrolling control of the first pair of scrolling controls may cause a corresponding face of the first pair of faces to move in a direction corresponding to a direction of the scrolling.

The non-transitory computer-readable medium may further store instructions that, when executed by the processor, cause the processor to: compute a plurality of proposed locations for a face of the proposed bounding box in accordance with confidence scores of locations of the face computed based on discontinuities detected in the scene; and present the plurality of proposed locations for the face of the proposed bounding box.

The non-transitory computer-readable medium may further store instructions that, when executed by the processor, cause the processor to present the plurality of proposed locations for the face of the proposed bounding box by providing user feedback in response to user input received via the plurality of controls.

The non-transitory computer-readable medium may further store instructions that, when executed by the processor, cause the processor to display a rectilinear projection of the proposed bounding box and the three-dimensional representation of the scene.

The non-transitory computer-readable medium may further store instructions that, when executed by the processor, cause the processor to transmit the dimensions of the proposed bounding box over a computer network.

BRIEF DESCRIPTION OF THE DRAWINGS

The accompanying drawings, together with the specification, illustrate exemplary embodiments of the present invention, and, together with the description, serve to explain the principles of the present invention.

FIG. 1C is a flowchart of a method for updating a proposed bounding box according to some embodiments of the present disclosure.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1A:
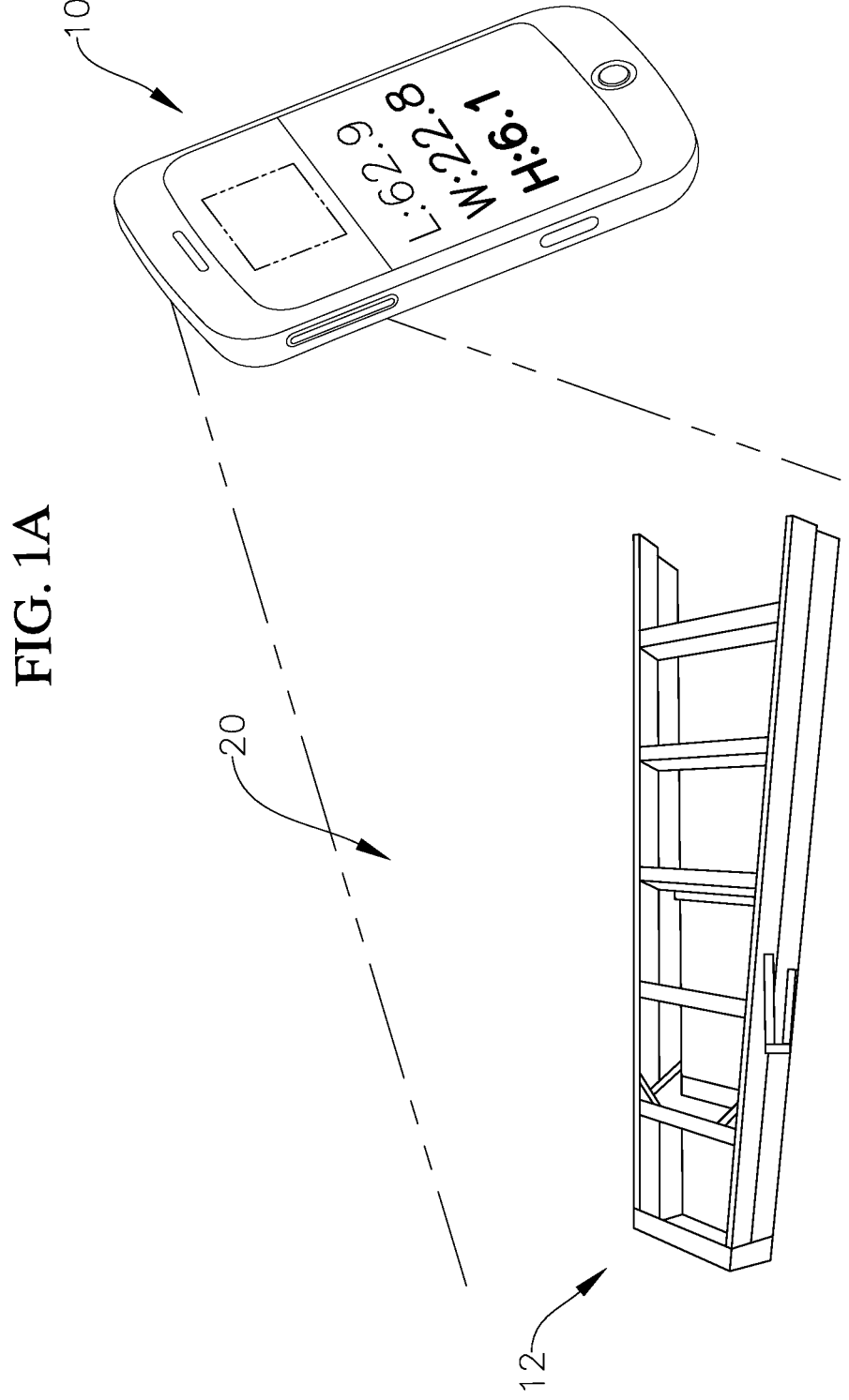
FIG. 1A is a schematic diagram of a handheld, contactless dimensioning device implementing a user interface according to some embodiments of the present disclosure.

FIG. 1A is a schematic diagram of a handheld, contactless dimensioning device implementing a user interface according to some embodiments of the present disclosure. The dimensioning device 10 may include a processor and memory storing instructions that configure the processor to perform operations in accordance with various embodiments of the present disclosure.

As shown in FIG. 1A, the dimensioning device 10 may be used by an operator to capture the physical dimensions (e.g., length, width, and height) of an object of interest 12 within a field of view 20 of the dimensioning device 10. For example, the field of view 20 of the dimensioning device 10 may be set by a depth reconstruction system incorporated into the dimensioning device 10, where the depth reconstruction system captures a three-dimensional representation of surfaces within the field of view 20. For example, in cases where the depth reconstruction system includes a depth camera system, the depth camera system may compute a depth map (or depth image) where each pixel in the depth map is an estimate of the distance from the depth camera system to the depicted surface in the field of view 20. The location of each pixel in the depth map corresponds to an angle between the optical axis of the depth camera system and the surface within the field of view 20 that is imaged by that pixel. Therefore, the depth map can be mathematically transformed directly into a collection of three-dimensional (3-D) points (e.g., having x, y, and z coordinates), where such a collection of 3-D points may be referred to as a point cloud. In some embodiments, the depth camera system captures a 3-D mesh model of the scene (e.g., by connecting the 3-D points of the point cloud), which represents the surfaces of objects in the scene based on vertices and surfaces (e.g., triangular planes) connecting the vertices. Accordingly, a depth camera system can capture 3-D representation of surfaces of objects in the field of view 20, where the representation may be in the form of a point cloud, a 3-D mesh model, or other representation of 3-D shapes.

Figure 1B:
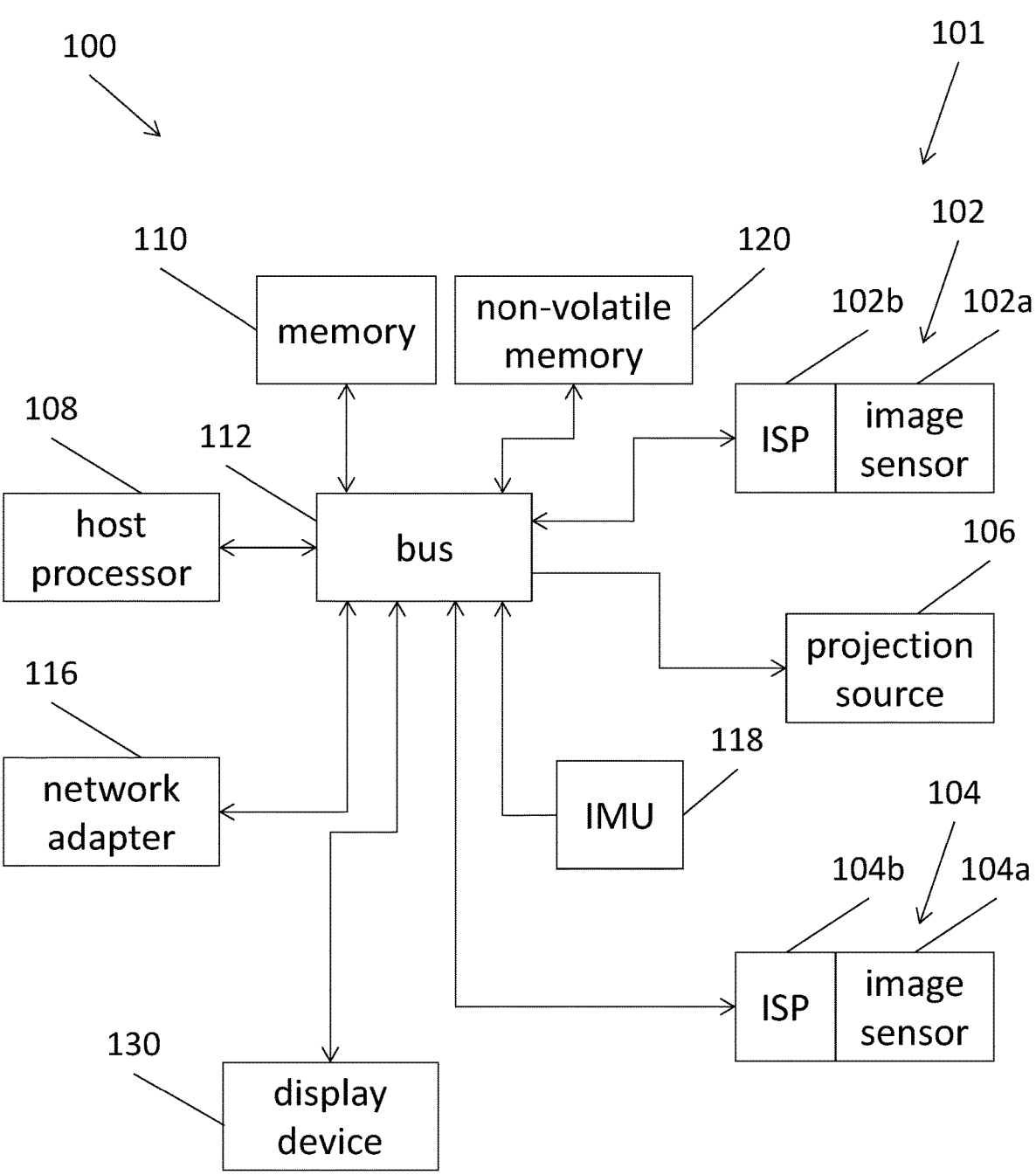
FIG. 1B is a block diagram illustrating a dimensioning device according to one embodiment of the present disclosure.

FIG. 1B is a block diagram illustrating a dimensioning device 100 according to one embodiment of the present disclosure. The dimensioning device 100 shown in FIG. 1B includes a depth reconstruction system 101 that includes a depth camera system that includes a first camera 102, a second camera 104, a projection source 106 (or illumination source or active projection system).

The dimensioning device 100 shown in FIG. 1B also includes a host processor 108 and memory 110, wherein the host processor may include, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 include corresponding image sensors 102a and 104a and may also include corresponding image signal processors (ISP) 102b and 104b. The various components may communicate with one another over a system bus 112. The dimensioning device 100 may include additional components such as a network adapter 116 to communicate with other devices, an inertial measurement unit (IMU) 118 such as a gyroscope to detect acceleration of the dimensioning device 100 (e.g., detecting the direction of gravity to determine orientation), non-volatile memory 120 (or non-transitory memory or persistent memory) such as NAND flash memory for storing data collected and processed by the dimensioning device 100, and a display device 130 for displaying a user interface and, in embodiments where the display device 130 is a touch-sensitive display device (e.g., a touchscreen), for receiving user input. The IMU 118 may be of the type commonly found in many modern smartphones. The dimensioning device 100 may also include other communication components, such as a universal serial bus (USB) interface controller.

Examples of depth camera systems include, but are not limited to, structured light depth cameras, active stereo depth camera systems (which include active light sources) as shown in the example of FIG. 1B, passive stereo depth camera system (which do not include active light sources, such as by omitting the projection source 106 shown in FIG. 1B), time of flight depth cameras, and the like. However, embodiments of the present disclosure are not limited to the use of depth camera systems for performing depth reconstruction. In some embodiments, depth reconstruction systems implement one or more techniques in accordance with: Structure from Motion, Machine Learning approaches (e.g., a neural network trained to compute depth maps from a stereo pair of images or from a single image), Depth from Defocus, etc., or full 3D reconstruction of an entire scene like simultaneous localization and mapping (SLAM).

In some embodiments of the present disclosure, the image sensors of the depth reconstruction system 101 (e.g., image sensor 102a and image sensor 104b) may be visible light image sensors or infrared image sensors. In embodiments of the present disclosure that include an active light projection source (e.g., projection source 106), the projection source is configured to emit light in a wavelength that falls within a detection range of the image sensors. For example, a visible light image sensor (e.g., with a red, green, and blue color filter array in an arrangement such as a Bayer filter mosaic) may be paired with a visible light projection source (e.g., emitting white light across a broad spectrum or a combination of red, green, and blue light) or an infrared image sensor may be paired with an infrared light emitting device (e.g., about 840 nm-860 nm in the near-infrared range).

FIG. 1C is a flowchart of a method 170 for updating a proposed bounding box according to some embodiments of the present disclosure. In some embodiments, the method 170 is implemented within the dimensioning device 10, such as by being represented as computer instructions stored within a memory (e.g., non-volatile memory 120), loaded into dynamic memory (e.g., memory 110) and executed by a processor (e.g., the host processor 108), thereby configuring the hardware components of the dimensioning device 10 to implement a special purpose device for contactless measurement of the dimensions of real-world objects.

At 171, the processor controls the depth reconstruction system (e.g., a depth camera system) to capture a 3-D representation of a scene containing an object. As noted above, in various embodiments of the present disclosure, the 3-D representation of the scene may be a point cloud, a depth map, or a mesh model.

At 172, the processor segments the object from the background in the 3-D representation of the scene. After capturing a depth map (or depth or point cloud) of the scene within the field of view 20 of the depth reconstruction system, the dimensioning device 10 may determine the object of interest to be dimensioned and separate the pixels (or points of the point cloud or vertices and surfaces of a mesh) associated with that object of interest from the other surfaces in the scene. This process of separating pixels associated with the object of interest from other pixels in the depth map may be referred to as segmenting the object from the depth map.

One technique for segmenting the object of interest is to apply a convolutional neural network (CNN) trained to perform instance segmentation on an image (e.g., color image) of the scene or view 20 in order to generate an instance segmentation mask, which identifies the pixels associated with different objects in the scene. The instance segmentation mask can then be applied to the depth map to extract the associated pixels. The object of interest may then be assumed to be object at substantially the center of the instance segmentation mask, and thus all of the corresponding pixels of the depth map are extracted to form the segmented object.

Another technique for segmenting the object relates to detecting a ground plane that the object of interest 12 is resting on, such as by detecting a flat plane of points adjacent to the shape that is at the center of the depth map, and selecting all points that are above that ground plane, where the upward direction may be determined based on information from an accelerometer in the dimensioning device 10. In a similar, manner to the technique using instance segmentation, in some embodiments the object of interest is assumed to be the object at substantially the center of the depth map (e.g., other objects extending above the ground plane but located at the edges of the depth map and not connected to the points at the center of the depth map are ignored as not being part of the object of interest).

At 173, after segmenting the object from the scene, the processor computes the dimensions of the object based on computing the dimensions of a minimum bounding box that surrounds the object, subject to a constraint that one face of the bounding box is parallel to the ground or ground plane that the object is resting on (e.g., where the bottom face and the top face are parallel to the ground and the other four faces are at a right angle or 90 degrees with respect to the ground). In more detail, a bounding box is a cuboid that encloses all of the points in the point cloud or depth map corresponding to the object of interest. A minimum bounding box for an object of interest is a bounding box that cannot be made any smaller because shrinking the box would cause a point of the point cloud corresponding to the object of interest to be outside of the bounding box. In some cases, there are multiple possible minimum bounding boxes. The additional constraint that one face of the computed bounding box be parallel to the ground can, in some instances, result in a case where there is a smaller bounding box where the faces of this smaller bounding box are at angles that are not parallel to the ground or not at 90 degrees with respect to the ground. At 174, the processor controls the display device (e.g., display device 130) to display a proposed bounding box for the segmented object.

Figure 2:
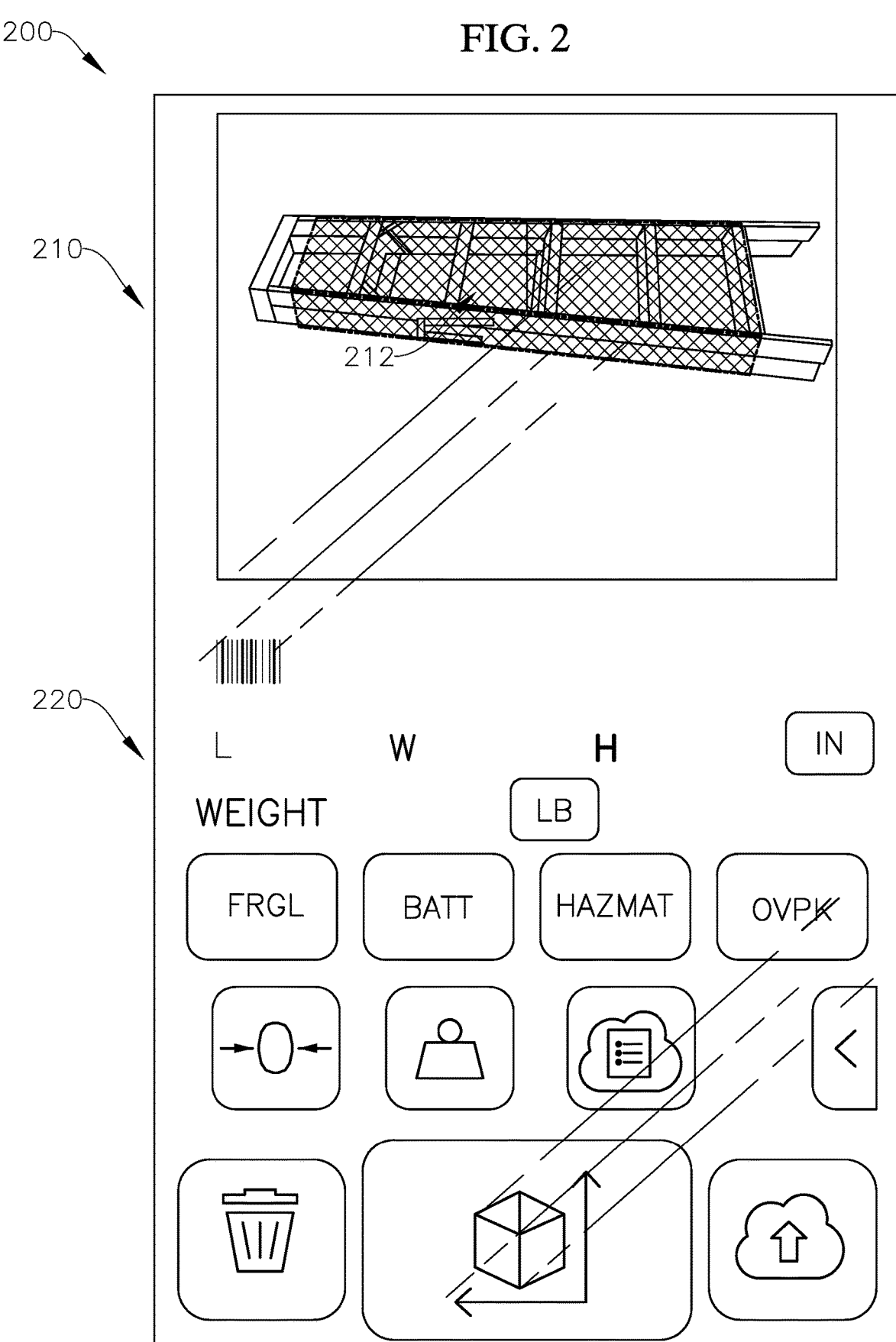
FIG. 2 is a screenshot depicting a user interface for a dimensioning device according to one embodiment of the present disclosure, where the user interface shows the capture of a depth map of a scene.

FIG. 2 is a screenshot depicting a user interface 200 for a dimensioning device according to one embodiment of the present disclosure, where the user interface 200 shows the capture of a depth map of a scene. An upper portion 210 of the user interface presents a live color image (e.g., a two-dimensional image) that overlaps with the field of view of the dimensioning device, and a lower portion 220 of the user interface depicts controls for controlling the dimensioning process. In the example shown in FIG. 2, a user is attempting to capture the dimensions of a ladder resting on the ground. The dimensioning device 10 controls its depth reconstruction system to capture a depth map or point cloud or other 3-D representation of the scene and applies an object segmentation process (such as that described above) to extract a point cloud corresponding to the object of interest. FIG. 2 shows a highlighted portion 212 of the live color image in the upper portion 210 corresponding to the locations of the points of the point cloud corresponding to the segmented object. Without limitation thereto, in some embodiments of the present disclosure, a stereoscopic user interface is presented through a stereoscopic user interface device such as augmented reality or virtual reality glasses or goggles. In such a case, a stereoscopic pair of live color images corresponding to views for a left eye and a right eye of a user (e.g., captured from two locations spaced apart from one another), and two-dimensional renderings of the depth map may be generated and overlaid on the stereoscopic pair of live color images (e.g., such that the depth map is shown with the correct corresponding perspective for each eye).

As seen in FIG. 2, when the dimensioning system segmented the ladder from the background at 172, it omitted the top and bottom of the ladder. Some types of objects may be more difficult to capture than others. For example, larger objects may pose a challenge due to extending beyond the field of view of the depth reconstruction system or requiring the depth reconstruction system to operate outside of its designed working range or distance, and may therefore require combining multiple captures of different parts of the object, such as by capturing separate discrete depth maps of the object or by performing a scan (e.g., a process that appears to be continuous to a user, in a manner similar to capturing the different parts of the object in a video). As another example, some objects may have challenging shapes (e.g., multiple holes, such as in the case of a ladder, where the ground is visible through the holes between the rungs) or appearance (e.g., distortions due to reflective surfaces or repeating textures). In this case, the highlighted portion 212 shows that the dimensioning system failed to include the top of the ladder and the feet of the ladder in its segmented point cloud.

Because the dimensioning system may fail to correctly segment the object from the background, the proposed bounding box computed by the processor may be incorrect. In the example shown in FIG. 2, the proposed bounding box computed based on the detected point cloud for the ladder would fail to enclose the top of the ladder and the feet of the ladder.

As such, aspects of embodiments of the present disclosure relate to user interfaces for users to adjust the positions of the faces of the proposed bounding box such that it correctly encloses the object being scanned (e.g., such that the proposed bounding box is a bounding box or true bounding box or actual bounding box for the object). In more detail, at 175 the processor receives a user input to adjust the position of one or more faces of the proposed bounding box, and at 176 the processor displays the updated proposed bounding box where the position of one of the faces is updated (and where the sizes of adjacent sides of the proposed bounding box are adjusted based on the repositioning of the one or more faces of the proposed bounding box). In some embodiments of the present disclosure, the dimensions are transmitted to another computing device (e.g., a server computer) over a computer network (e.g., a local area network or wide area network). Various embodiments of the present disclosure relating to different user interfaces for performing the resizing of the proposed bounding box will be described in more detail below.

The term "bounding box" as used herein refers to a computed three-dimensional cuboid volume (e.g., having a length dimension, a width dimension, and a height dimension), where the bounding box may initially be computed based on an estimated point cloud for an object detected in the scene (e.g., a minimum bounding box for the segmented point cloud for the object). The proposed bounding box computed based on the representation of the scene captured by the depth reconstruction system may not formally be a bounding box for the object because some portions of object may lie outside of the proposed 3-D cuboid volume. Similarly, the term "proposed bounding box" will also be used herein to refer to the cuboid volume as it is resized by the user through interactions with user interfaces according to various embodiments of the present disclosure, even though, at any given point, parts of the object may lie outside of the cuboid volume.

Figure 3:
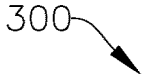
FIG. 3 is a screenshot depicting a user interface for a dimensioning device according to one embodiment of the present disclosure, where the user interface shows a proposed bounding box computed for the object detected in the scene.

FIG. 3 is a screenshot depicting a user interface 300 for a dimensioning device according to one embodiment of the present disclosure, where the user interface 300 shows a proposed bounding box computed for the object detected in the scene. As shown in FIG. 3, the upper portion 310 of the user interface shows a proposed bounding box 312 in place of the shaded point cloud shown in FIG. 2, where the proposed bounding box 312 was generated automatically from the output of the depth sensor to encompass all of the pixels corresponding to the point cloud (e.g., the highlighted portion 212 of the point cloud as shown in FIG. 2). As before, the lower portion 320 of the user interface 300 shows controls associated with the dimensioning process. In addition, the lower portion 320 shows the computed dimensions of the proposed bounding box 312. In this example, the proposed bounding box has a length (L) of 62.9 in., a width (W) of 22.8 in., and a height of 6.1 in.

As can be seen in the upper portion 310 of the user interface 300 shown in FIG. 3, the top of the ladder and the feet of the ladder are not included in the proposed bounding box (e.g., because the depth reconstruction system did not capture 3-D points for those surfaces or because there was an error in the process of segmenting the object from the background).

Accordingly, aspects of embodiments of the present disclosure relate to user interfaces to provide users with a method for adjusting the proposed bounding box of an item or object after scanning. In some embodiments described below, the proposed bounding boxes are cuboids having three pairs of parallel faces, and the adjustment of each pair of faces is mapped onto three corresponding pairs of user interface controls. In some embodiments of the present disclosure, the user interface controls are displayed separately from the proposed bounding box (e.g., in a separate part of the display device than the proposed bounding box), such that the actuation of the user interface controls (e.g., using a finger) does not obscure the user's view of the proposed bounding box that is being adjusted. The methods for adjusting the proposed bounding box are intuitive for users and some aspects of embodiments of the present disclosure relate to adapting the user interface for fine control using touchscreen and gestural user interfaces (e.g., without using a computer mouse or keyboard).

Figure 4:
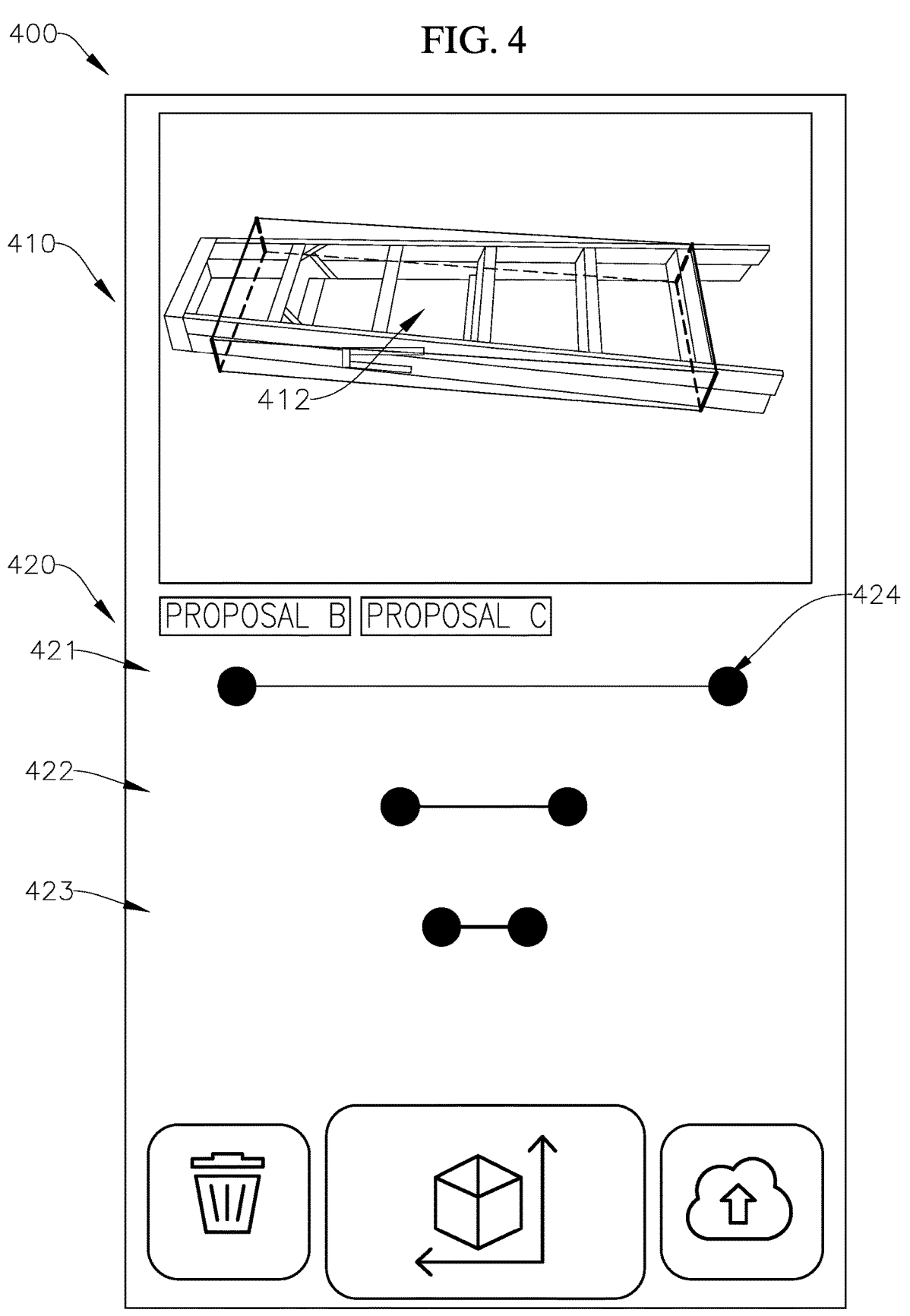
FIG. 4 is a screenshot depicting a user interface for a dimensioning device according to one embodiment of the present disclosure, where the user interface shows user interface controls for adjusting a proposed bounding box computed for the object detected in the scene.

FIG. 4 is a screenshot depicting a user interface 400 for a dimensioning device according to one embodiment of the present disclosure, where the user interface 400 shows controls for adjusting a proposed bounding box computed for the object detected in the scene. In more detail, the upper portion 410 of the user interface continues to show a live color preview of the scene and the computed proposed bounding box 412. As seen in FIG. 4, the edges of the proposed bounding box 412 may have different shadings or colorings corresponding to whether the edge is labeled as the length, width, or height of the proposed bounding box (e.g., red for length, green for width, and blue for height). Corresponding shading or coloring is applied to the length, width, and height dimensions shown in the lower portion 420 of the user interface 400.

The lower portion 420 of the user interface 400 shown in FIG. 4 includes three line segments, each corresponding to a different dimension of the proposed bounding box. In FIG. 4, a first line segment 421 corresponds to a first dimension (e.g., a length dimension), a second line segment 422 corresponds to a second dimension (e.g., a width dimension), and a third line segment 423 corresponds to a third dimension (e.g., a height dimension). Draggable handles (e.g., handle 424 shown in FIG. 4 as a circular dot) at the ends of the line segments correspond to the absolute positions of the endpoints of the proposed bounding box. As such, the length of each line segment corresponds to the length of a corresponding dimension of the proposed bounding box. In the example shown in FIG. 4, the first line segment 421 is longer than the second line segment 422, which is longer than the third line segment 423. The relative lengths of the line segments correspond to the relative lengths of the dimensions of the proposed bounding box, in that the length of the proposed bounding box (from the feet of the ladder to the top of the ladder) is longer than the width of the proposed bounding box (in the direction parallel to the rungs of the ladder), which is longer than the height of the proposed bounding box (the thickness of the ladder).

By touching or clicking on a handle or dot at an end of a line segment and dragging the handle along the direction of the line segment, the operator can manually adjust the position of each of the six sides of the proposed bounding box such that the proposed bounding box accurately corresponds to the physical shape of the object (e.g., such that the proposed bounding box encloses the object). For example, dragging on the left handle of the first line segment 421 controls the location of the side of the proposed bounding box 412 near the top of the ladder, whereas dragging on the right handle 424 of the first line segment 421 controls the location of the side of the proposed bounding box 412 near the feet of the ladder.

Figure 5A:
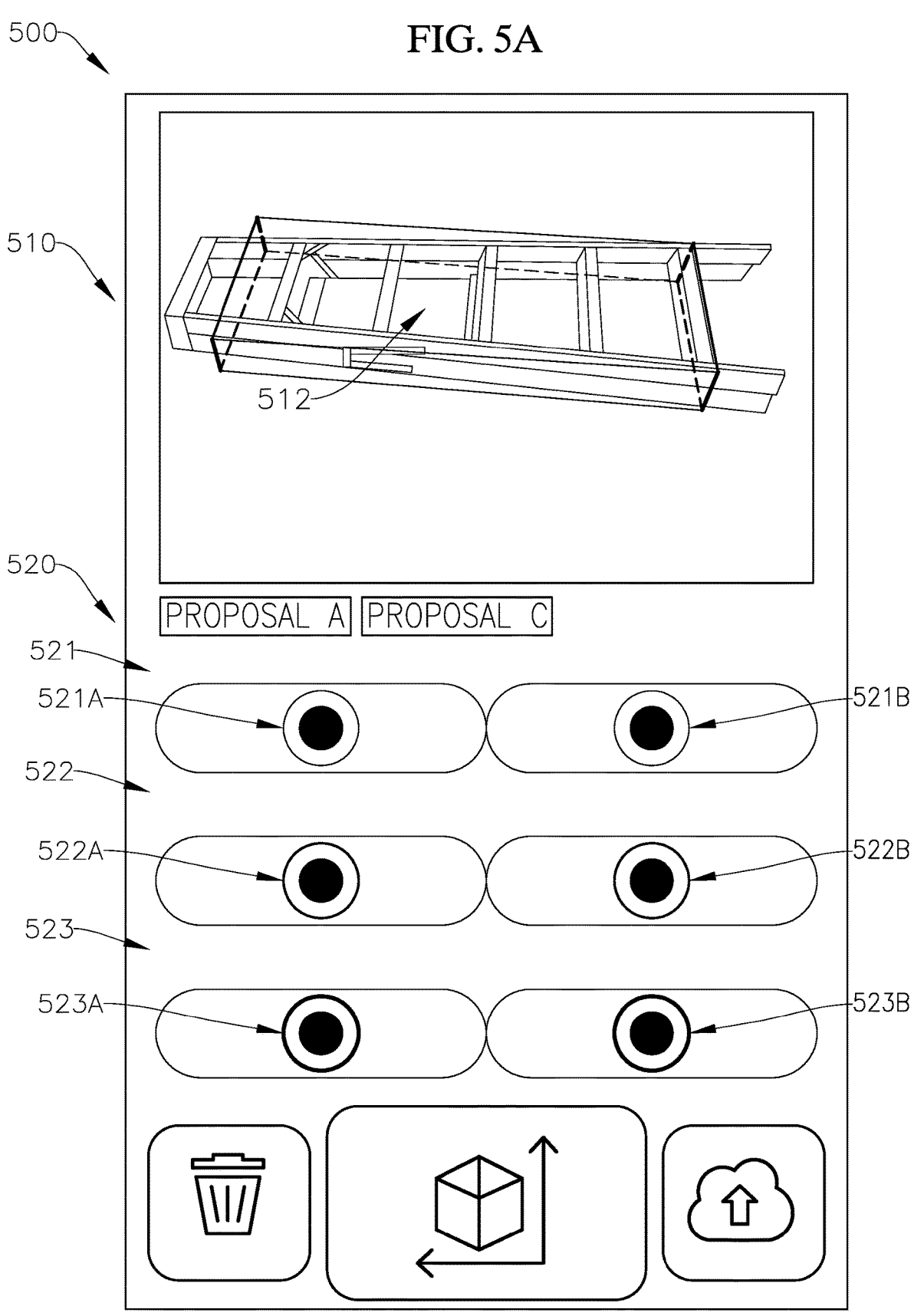
FIGS. 5A, 5B, and 5C are screenshots depicting a user interface for a dimensioning device according to one embodiment of the present disclosure, where the user interface shows user interface controls for adjusting a proposed bounding box computed for the object detected in the scene.
Figure 5B:
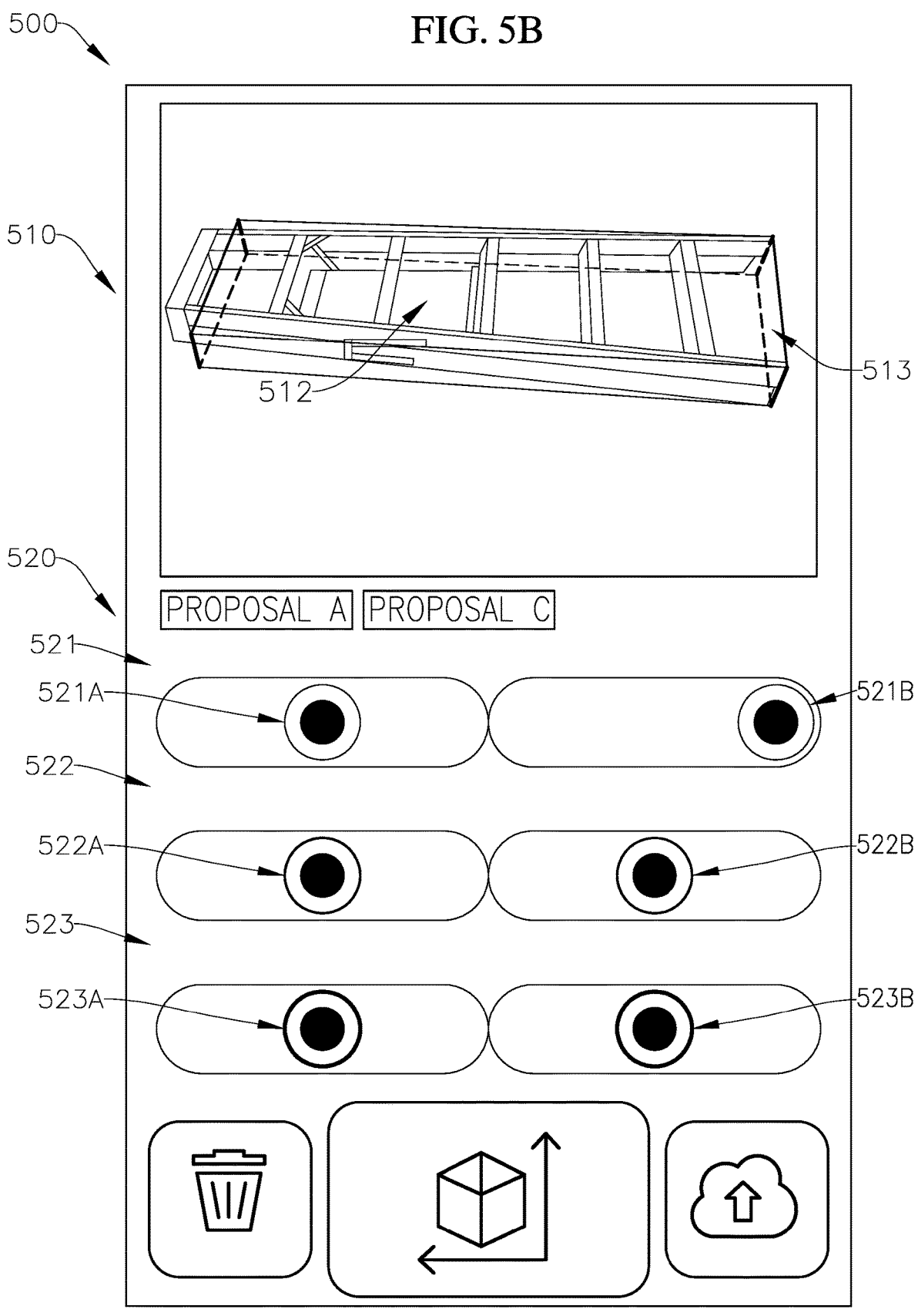
Figure 5C:
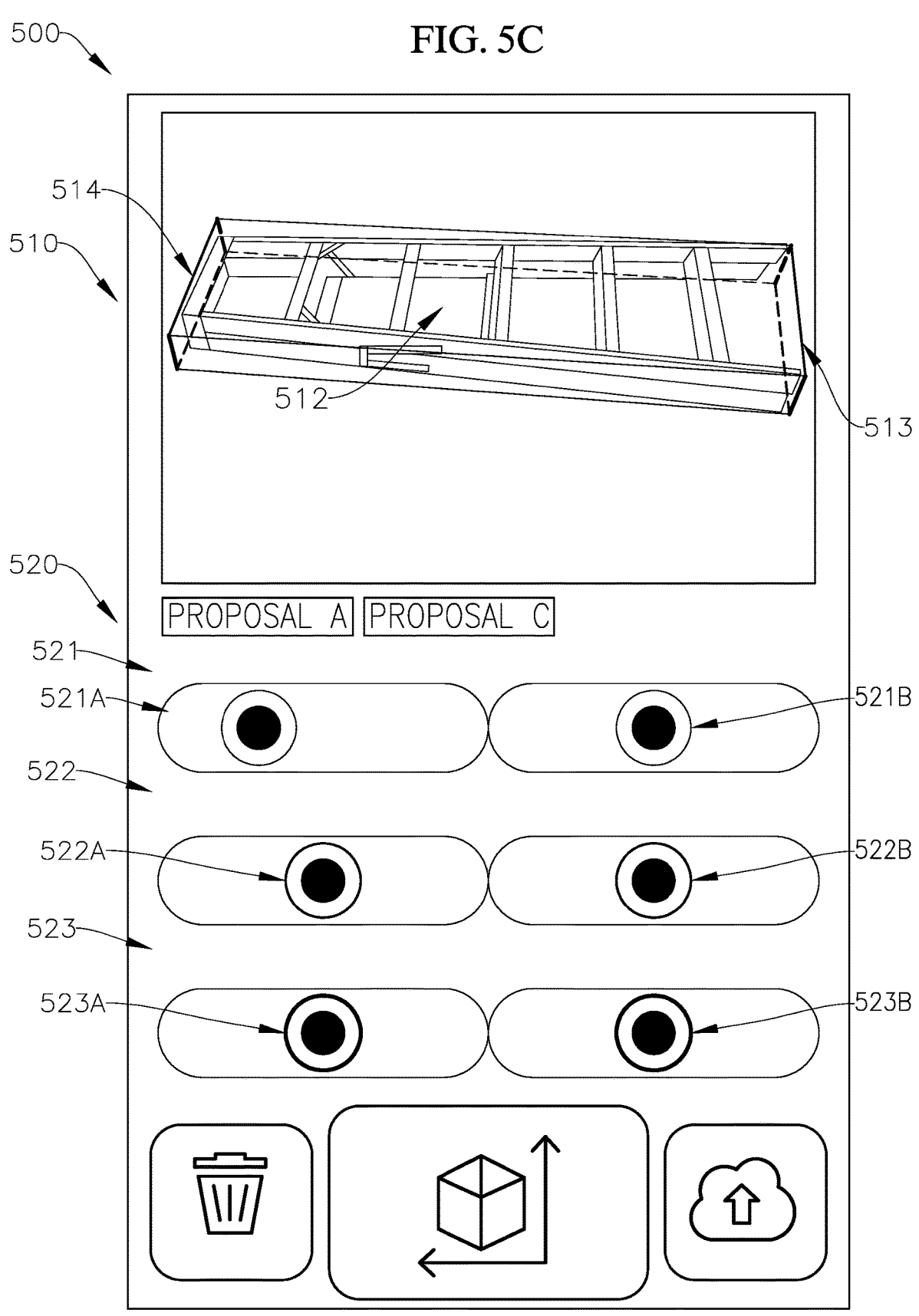

FIGS. 5A, 5B, and 5C are screenshots depicting a user interface 500 for a dimensioning device according to one embodiment of the present disclosure, where the user interface shows controls for adjusting a proposed bounding box computed for the object detected in the scene. In more detail, the upper portion 510 of the user interface 500 continues to show a live color preview of the scene and the computed proposed bounding box 512 with edges along the different dimensions (length, width, and height) in different corresponding colors. Similar shading is applied to corresponding user interface controls shown in the lower portion 520 including user interface controls 521, 522, and 523 for adjusting the length, width, and height dimensions of the proposed bounding box 512.

In the example shown in FIG. 5A, each of the user interface controls for adjusting a dimension of the box includes a separate user interface control for the two faces of the proposed bounding box corresponding to a given dimension. The length user interface control 521 for adjusting a size of the proposed bounding box 512 along a length dimension (e.g., a first dimension) includes a first length sub-control 521A for adjusting one end of the proposed bounding box 512 along the length direction (e.g., the left side face of the proposed bounding box 512 shown in the upper portion 510) and a second length sub-control 521B for adjusting the other end of the proposed bounding box 512 along the length direction (e.g., the right side face of the proposed bounding box 512 shown in the upper portion 510). Similarly, the width user interface control 522 for adjusting the width of the proposed bounding box 512 includes a first width sub-control 522A for adjusting the position of one face of the proposed bounding box 512 along the width dimension (e.g., a second dimension) and a second width sub-control 522B for adjusting the position of the other face of the proposed bounding box 512 along the width dimension. First width sub-control 523A and second width sub-control 523B of the height user interface control 523 perform similar functions for the faces at the ends of the height dimension (e.g., the top and bottom of the proposed bounding box 512 at opposite ends along a third dimension).

Each sub-control is shown in FIG. 5A has a slider, where a dot or handle within the slider is constrained to one direction within the user interface (e.g., constrained to slide horizontally in FIG. 5A). Sliding the dot or handle at the center of the slider moves a corresponding face of the proposed bounding box 512 in a direction (e.g., to move the corresponding face of the proposed bounding box 512 to make the proposed bounding box 512 larger or smaller in a given direction). For example, in the embodiment shown in FIG. 5A, the first sub-control 521A has a handle (a dot) that is constrained to move along one dimension (horizontally in the user interface). The second sub-control 521B also has a handle (or dot) that is constrained to move along the same line as the first sub-control 521A. Aligning the first sub-control 521A with the second sub-control 521B along a same axis in the user interface provides an intuitive user interface for controlling the positions of the two corresponding faces of the proposed bounding box. Sliding a handle toward a central point between the first sub-control 521A and the second sub-control 521B moves the corresponding face of the proposed bounding box closer to the center (e.g., shrinks the proposed bounding box), and sliding the handle away from the central point (e.g., towards the edges of the display) moves the corresponding face of the proposed bounding box away from the center (e.g., grows the proposed bounding box) where the speed of the movement of the face is controlled by how far the handle has been displaced from the center of the sub-control. The width control 522 and the height control 523 behave in similar manners to control the positions of the corresponding faces of the proposed bounding box 512. In the example shown in FIG. 5A, the handles are all in their default positions at the centers of their respective sub-controls, and therefore none of the faces of the proposed bounding boxes are being moved.

FIG. 5B illustrates the adjustment of the position of the right face 513 of the proposed bounding box 512. In this example, dragging the handle of the slider of the second sub-control 521B to the right makes the proposed bounding box larger. Dragging the dot or handle farther along the slider increases the speed at which the corresponding face of the proposed bounding box 512 moves, as shown in the upper portion 510 of the user interface 500. Releasing the dot or handle (e.g., releasing the mouse or lifting a finger off the touch screen) causes movement of the face of the proposed bounding box 512 to stop and for the dot to return to the center of its corresponding sub-control.

FIG. 5C illustrates the further adjustment of the position of the left face 514 of the proposed bounding box 512. (Note that FIG. 5C shows that the right face of the proposed bounding box 512 has been adjusted to encompass the feet of the ladder.) By dragging the dot of the first sub-control 521A to the left, the left face 514 of the proposed bounding box 512 is adjusted to encompass the top of the ladder as well.

Multiple handles can be manipulated at the same time. For example, sliding the handles of both the first length sub-control 521A and the second length sub-control 521B to the left causes the proposed bounding box to shift in the corresponding direction. Pinching the handles for a same dimension together causes the proposed bounding box to shrink in that dimension, and spreading the handles apart causes the proposed bounding box to grow in that dimension. In addition, moving multiple for different orthogonal faces of the of the proposed bounding box causes the proposed bounding box to change in those multiple dimensions at the same time.

Figure 6:
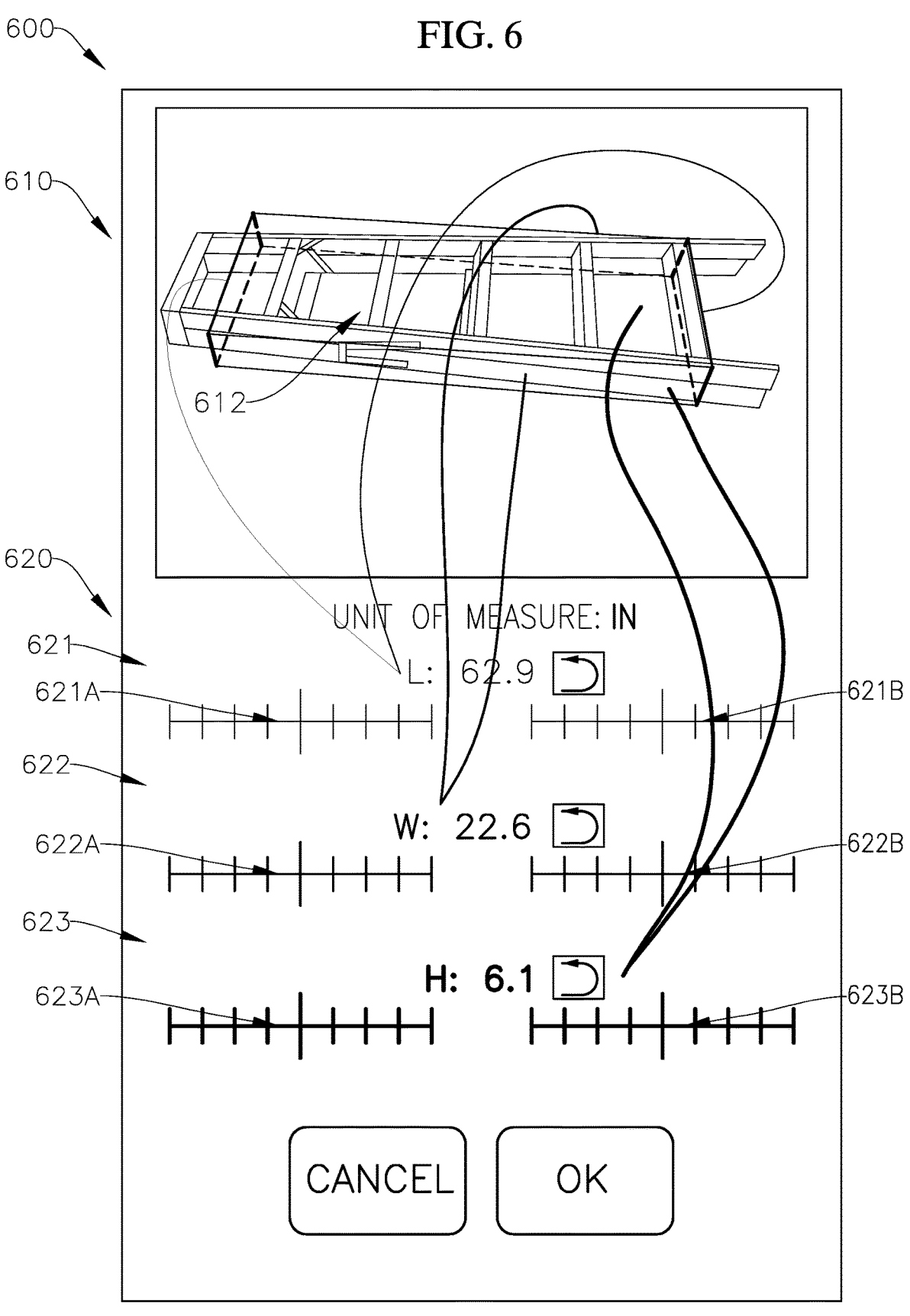
FIG. 6 is a screenshot depicting a user interface for a dimensioning device according to one embodiment of the present disclosure, where the user interface shows user interface controls for adjusting a proposed bounding box computed for the object detected in the scene.

FIG. 6 is a screenshot of a user interface for adjusting the positions of faces of a proposed bounding box according to one embodiment of the present disclosure. FIG. 6 also shows annotations in the form of curves that connect a face of a proposed bounding box 612 shown in an upper portion 610 of the user interface 600 to its respective user interface control in the lower portion 620 of the user interface 600. In the embodiment shown in FIG. 6, shows a first user interface control 621 for controlling the size of the proposed bounding box along a first dimension (e.g., a length dimension, a second user interface control 622 for controlling the size of the proposed bounding box along a second dimension (e.g., a width dimension) and a third user interface control 623 for controlling the size of the proposed bounding box along a third dimension (e.g., a height dimension). The first user interface control 621, the second user interface control 622, and the third user interface control 623 in these embodiments operate as scrolling user interface controls.

The first user interface control 621 is shown in FIG. 6 as being configured for adjusting the length of the proposed bounding box 612 and includes a first length sub-control 621A for adjusting one end of the proposed bounding box 612 along the length direction (e.g., the left side face of the proposed bounding box 612 shown in the upper portion 610) and a second length sub-control 621B for adjusting the other end of the proposed bounding box 612 along the length direction (e.g., the right side face of the proposed bounding box 612 shown in the upper portion 610). Similarly, the second user interface control 622 is shown in FIG. 6 as being configured for adjusting the width of the proposed bounding box 612 and includes a first width sub-control 622A for adjusting the position of one face of the proposed bounding box 612 along the width direction and a second width sub-control 622B for adjusting the position of the other face of the proposed bounding box 612 along the width direction. First height sub-control 623A and second height sub-control 623B of third user interface control 623, shown in FIG. 6 as being configured for adjusting the height of the proposed bounding box 612, perform similar functions for the faces at the ends of the height dimension (e.g., the top and bottom of the proposed bounding box 612).

Each sub-control is shown in FIG. 6 as a set of lines, suggesting that the area can be gripped and manipulated. In some embodiments, the sub-controls may have the appearance evocative of a scroll wheel or thumb wheel. In some embodiments, each of the sub-controls is a scrolling user interface control that behaves in a manner like a scroll wheel of a computer mouse or scrolling a web page on a trackpad, where swiping along the sub-control in one direction or the other causes the corresponding face to move along a direction corresponding to the swipe direction by a distance corresponding to the distance swiped. In some embodiments, the swipe behaves with inertia (similar to inertial scrolling behavior of a trackpad or touchpad mouse or of a computer mouse with a free-spinning scroll wheel), thereby allowing for both large and fine adjustments to be made using the same user interface control. In some embodiments, a faster swipe results in a larger movement of the corresponding face of the proposed bounding box, thereby allowing rapid gross changes, whereas a slower swipe results in smaller movements of the corresponding face of the proposed bounding box, thereby allowing precise control over the position of the corresponding face of the proposed bounding box. In some embodiments, the computer system provides haptic feedback, such as by generating a clicking sensation based on how quickly the swipe is causing the position or positions of the faces of the proposed bounding box to move.

In addition, some embodiments relate to placing the sub-controls for adjusting the two faces of a same dimension side by side, with the directions of the control along a same axis. This arrangement enables a user to adjust multiple faces quickly. For example, if the user wanted to make an object longer or shorter along the length direction on both sides, the user can use a "pinch to zoom" gesture on top the two corresponding sliders or sub-controls 621A and 621B in the user interface, allowing the user to adjust both faces simultaneously or concurrently. For example, sliding both sliders corresponding to a dimension toward the center of the display (e.g., pinching) would shorten the proposed bounding box 612 along that dimension by moving both corresponding faces of the proposed bounding box closer to the center of the proposed bounding box, while sliding both sliders away from the center (e.g., a spread gesture) would lengthen the proposed bounding box 612 along that dimension by moving both corresponding faces of the proposed bounding box away from the center of the proposed bounding box.

Accordingly, aspects of embodiments of the preset disclosure provide a simple and intuitive user interface for adjusting the dimensions of a proposed bounding box that was automatically computed to encompass the shape of a physical object based on the estimated outermost (extreme) portions as captured by a contactless measurement system (e.g., a depth reconstruction system such as a depth camera system).

Some aspects of embodiments of the present disclosure further relate to automatically indicating other potential locations for the placement of the proposed bounding box. For example, the underlying data from the depth reconstruction system may have some amount of noise or ambiguity in the data, such as where spurious points, outliers, or artifacts may appear due to confusing textures, reflections, or the like. Accordingly, the process of segmenting the object from the background may be error prone and may remove parts of the object that should be included within the proposed bounding box (e.g., in the case of excluding the top of the ladder and feet of the ladder as shown in FIG. 3). In such cases, the initially displayed proposed bounding box may be a best estimate computed by the dimensioning device based on the given data from the depth reconstruction system. As another example, a depth reconstruction system of the dimensioning device may include multiple depth detection methods (e.g., a time-of-flight camera system in addition to a stereo depth camera system).

Nevertheless, the underlying data captured by the depth reconstruction system may include sufficient information to generate a plurality of different proposed locations of a face of the proposed bounding box based on different sets of points that are computed to be likely positions of the sides and edges of the object. A given proposed location of a face of the proposed bounding box may be associated with a confidence score. For example, edges of the object may be detected based on sharp discontinuities in the 3-D reconstruction of the scene. An object with holes, such as the ladder shown in FIG. 2, has discontinuities at the edges of those holes, and therefore the rungs may be interpreted during the segmentation process as edges of the object. In some embodiments, locations of a face of the proposed bounding box that result in enclosing the points on one side of the discontinuity and excluding (presumed background) points on the other side of the discontinuity may have a higher confidence score than locations of the face where the face is not located at a discontinuity in the depth map. In some embodiments, the confidence score is adjusted or weighted based on which portions of the face are at a discontinuity in the 3-D reconstruction of the scene.

In some embodiments, the processor detects additional possible locations of the faces of the proposed bounding box based on identifying sharp discontinuities in the additional points that are adjacent to the point cloud of the object of interest that are also above the ground plane (e.g., based on a flood fill operation on the depth map). In some embodiments making using of an instance segmentation map to compute the segmentation mask, each pixel in the segmentation map may be associated with a plurality of confidence scores corresponding to different possible instances. In some embodiments, the highest confidence score instance is used to label a part of the segmentation map. However, some pixels may be misclassified (e.g., as belong to a different instance than a centrally located object of interest) in which case pixels where the same object is among the highest confidence instances (e.g., the second or third highest confidence instance) may also be included in the point cloud and for computing additional possible locations of the faces of the proposed bounding box.

In some embodiments of the present disclosure, the processor uses these additional locations to suggest other locations that may correspond to the correct positions for the faces of the proposed bounding box. For example, the point cloud 212 shown in FIG. 2 represents portions of the depth map captured by the depth reconstruction system that were determined to be part of the object of interest. However, the depth reconstruction system also captured other points corresponding to the three-dimensional locations of other surfaces within its field of view and excluded some of these points from the point cloud 212 corresponding to the segmented object. In addition, the different types of depth detection methods included in the depth reconstruction system may provide different data regarding the three-dimensional locations of various surfaces in the field of view of the dimensioning device.

Accordingly, some aspects of embodiments of the present disclosure further relate to automatically providing suggestions or additional or alternative proposals regarding other positions at which the faces of the proposed bounding box can be located. In some embodiments, the additional proposals are accessible through user interface elements, such as buttons labeled "PROPOSAL: B" and "PROPOSAL: C" in FIG. 4 and buttons labeled "PROPOSAL: A" and "PROPOSAL: C" in FIG. 5A, FIG. 5B, and FIG. 5C. In some embodiments, selecting a user interface element for a proposal (e.g., selecting a PROPOSAL button) causes the positions of faces of the proposed bounding box to be set to those of the corresponding proposal. This allows a user to view the different proposals and select the one of these proposals to either accept as the bounding box for the object or to refine the positions of the proposed bounding box to encompass the object.

In some embodiments, a line segment, such as that shown in FIG. 4, may show additional possible locations of the correct edges of the proposed bounding box, based on these alternative locations. In some embodiments, dragging the handles 424 of the user interface controls may cause the handle to "snap" to an alternative location (e.g., positions on the slider near the alternative location may be registered as indications to select that alternative location), thereby providing user feedback regarding to the computed alternative proposed locations for the corresponding face of the bounding box. As another example, the snap user feedback may also be applied to the embodiments shown in FIGS. 5A, 5B, and 5C, such that, when moving a face of the proposed bounding box using the sub-controls, the face will briefly stop moving when it reaches a possible alternative location, and may resume moving again if the user continues to hold the slider for an additional amount of time or if the user releases the slider and then re-engages the slider. Similarly, the snap effect may be applied to the embodiments shown in FIG. 6, where the movement of the scrolling region stops or exhibits resistance when a corresponding face reaches a possible alternative location. In these embodiments, haptic user feedback may be provided to the user in the form of a clicking sensation or a sensation of engagement latching into a shallow groove when snapping to an alternative location.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while the examples shown herein and discussed above show the adjustment of the proposed bounding box as overlaid on a view of the scene within the field of view of the depth reconstruction system, embodiments of the present disclosure are not limited thereto.

In some embodiments, the upper portion of the user interface displays a projection of the proposed bounding box (and the point cloud and/or depth map of the scene) along rectilinear directions, such as an axis corresponding the height direction, an axis corresponding to the length direction, and an axis corresponding to the width direction. For example, when a user changes the values for the width and length directions, a top-down view along the Z-axis could be shown as an option instead of the current view. In such a rectilinear projection of the proposed bounding box, one of the dimensions of proposed bounding box is hidden (because it is aligned with the viewing direction). This improves the visibility of the direction or directions that are being adjusted. In addition, in some embodiments the user interface controls for controlling the hidden dimension of the proposed bounding box are also hidden or disabled, to reduce potential user confusion from making an adjustment that is not visible from the current view. In some embodiments, a rectilinear view is activated based on manipulating a control for adjusting the position of the face (e.g., selecting one of the rectilinear views in which the selected dimension is visible). In some embodiments, the transition between the view from the viewpoint of the depth reconstruction system to the rectilinear direction is smoothly animated to help the user understand how the new view relates to the previous view.

What is claimed is:

1. An object dimensioning device comprising:
a depth reconstruction system;
a display device; and
a processor and memory storing instructions that, when executed by the processor, cause the processor to:

control the depth reconstruction system to capture a three-dimensional representation of a scene;
segment a plurality of points from the three-dimensional representation of the scene, the plurality of points corresponding to an object in the scene;
compute a proposed bounding box around the plurality of points;
display the proposed bounding box on the display device and a plurality of user interface controls configured to adjust locations of corresponding faces of the proposed bounding box, the user interface controls being displayed separately from the proposed bounding box;
receive an input through a control of the plurality of user interface controls to adjust a position of a corresponding face of the proposed bounding box;
display the proposed bounding box with the position of the corresponding face of the proposed bounding box adjusted in accordance with the input; and
display dimensions of the proposed bounding box on the display device,
wherein the memory further stores instructions that, when executed by the processor, cause the processor to:
compute a plurality of proposed locations for a face of the proposed bounding box in accordance with confidence scores of locations of the face computed based on discontinuities detected in the scene; and
present the plurality of proposed locations for the face of the proposed bounding box.

2. The object dimensioning device of claim 1, wherein the user interface controls comprise:
a first line segment corresponding to a length dimension of the proposed bounding box;
a second line segment corresponding to a width dimension of the proposed bounding box; and
a third line segment corresponding to a height dimension of the proposed bounding box; and
wherein the input comprises adjusting a position of a handle at an end of the first line segment and wherein the corresponding face is a face at an end of the proposed bounding box along the length dimension.

3. The object dimensioning device of claim 2, wherein relative lengths of the first line segment, the second line segment, and the third line segment respectively correspond to relative lengths of a length, a width, and a height of the proposed bounding box.

4. The object dimensioning device of claim 1, wherein the user interface controls comprise:
a first pair of sliders configured to control a first pair of faces at opposite ends of a length dimension of the proposed bounding box;
a second pair of sliders configured to control a second pair of faces at opposite ends of a width dimension of the proposed bounding box; and
a third pair of sliders configured to control a third pair of faces at opposite ends of a height dimension of the proposed bounding box,
wherein a handle of a slider of the first pair of sliders is constrained to move along one dimension of the display device,
wherein dragging the handle of the slider of the first pair of sliders in a first direction along the one dimension of the display device causes the corresponding face of the first pair of faces to move in a first direction along the length dimension of the proposed bounding box, and
wherein dragging the handle of the slider of the first pair of sliders in a second direction along the one dimension causes the corresponding face of the first pair of faces to move in a second direction opposite the first direction along the length dimension of the proposed bounding box.

5. The object dimensioning device of claim 4, wherein a speed at which the corresponding face moves is controlled by a distance that the handle of the slider is dragged along the first direction.

6. The object dimensioning device of claim 1, wherein the user interface controls comprise:

a first pair of scrolling controls configured to control a first pair of faces at opposite ends of a length dimension of the proposed bounding box;

a second pair of scrolling controls configured to control a second pair of faces at opposite ends of a width dimension of the proposed bounding box; and a third pair of scrolling controls configured to control a third pair of faces at opposite ends of a height dimension of the proposed bounding box, wherein scrolling a first scrolling control of the first pair of scrolling controls causes a corresponding face of the first pair of faces to move in a direction corresponding to a direction of the scrolling.

7. The object dimensioning device of claim 1, wherein the memory further stores instructions that, when executed by the processor, cause the processor to present the plurality of proposed locations for the face of the proposed bounding box by providing user feedback in response to user input received via the plurality of user interface controls.

8. The object dimensioning device of claim 1, wherein the memory further stores instructions that, when executed by the processor, cause the processor to display a rectilinear projection of the proposed bounding box and the three-dimensional representation of the scene.

9. The object dimensioning device of claim 1, further comprising a network adapter, wherein the memory further stores instructions that, when executed by the processor, cause the processor to transmit the dimensions of the proposed bounding box through a computer network using the network adapter.

10. A non-transitory computer-readable medium storing instructions that, when executed by a processor, cause the processor to:

receive a three-dimensional representation of a scene captured by a depth reconstruction system;

segment a plurality of points from the three-dimensional representation of the scene, the plurality of points corresponding to an object in the scene;

compute a proposed bounding box around the plurality of points;

display the proposed bounding box in a user interface and a plurality of controls configured to adjust locations of corresponding faces of the proposed bounding box, the user interface controls being displayed separately from the proposed bounding box;

receive an input through a control of the plurality of controls to adjust a position of a corresponding face of the proposed bounding box;

display the proposed bounding box with the position of the corresponding face of the proposed bounding box adjusted in accordance with the input; and display dimensions of the proposed bounding box in the user interface, wherein the controls comprise:

a first line segment corresponding to a first dimension of the proposed bounding box;

a second line segment corresponding to a second dimension of the proposed bounding box; and a third line segment corresponding to a third dimension of the proposed bounding box; and wherein the input comprises adjusting a position of a handle at an end of the first line segment and wherein the corresponding face is a face at an end of the proposed bounding box along the first dimension.

11. The non-transitory computer-readable medium of claim 10, wherein relative lengths of the first line segment, the second line segment, and the third line segment respectively correspond to relative lengths of a length, a width, and a height of the proposed bounding box.

12. The non-transitory computer-readable medium of claim 10, further storing instructions that, when executed by the processor, cause the processor to:

compute a plurality of proposed locations for a face of the proposed bounding box in accordance with confidence scores of locations of the face computed based on discontinuities detected in the scene; and present the plurality of proposed locations for the face of the proposed bounding box.

13. The non-transitory computer-readable medium of claim 12, further storing instructions that, when executed by the processor, cause the processor to present the plurality of proposed locations for the face of the proposed bounding box by providing user feedback in response to user input received via the plurality of controls.

14. The non-transitory computer-readable medium of claim 10, further storing instructions that, when executed by the processor, cause the processor to display a rectilinear projection of the proposed bounding box and the three-dimensional representation of the scene.

15. The non-transitory computer-readable medium of claim 10, further storing instructions that, when executed by the processor, cause the processor to transmit the dimensions of the proposed bounding box over a computer network.

16. A non-transitory computer-readable medium storing instructions that, when executed by a processor, cause the processor to:

receive a three-dimensional representation of a scene captured by a depth reconstruction system;

segment a plurality of points from the three-dimensional representation of the scene, the plurality of points corresponding to an object in the scene;

compute a proposed bounding box around the plurality of points;

display the proposed bounding box in a user interface and a plurality of controls configured to adjust locations of corresponding faces of the proposed bounding box, the user interface controls being displayed separately from the proposed bounding box;

receive an input through a control of the plurality of controls to adjust a position of a corresponding face of the proposed bounding box;

display the proposed bounding box with the position of the corresponding face of the proposed bounding box adjusted in accordance with the input; and display dimensions of the proposed bounding box in the user interface, wherein the controls comprise:

a first pair of sliders configured to control a first pair of faces at opposite ends of a first dimension of the proposed bounding box;

a second pair of sliders configured to control a second pair of faces at opposite ends of a second dimension of the proposed bounding box; and a third pair of sliders configured to control a third pair of faces at opposite ends of a third dimension of the proposed bounding box, wherein a handle of a slider of the first pair of sliders is constrained to move along one dimension of the user interface, wherein dragging the handle of the slider of the first pair of sliders in a first direction along the one dimension of the user interface causes the corresponding face of the first pair of faces to move in a first direction along the first dimension of the proposed bounding box, and wherein dragging the handle of the slider of the first pair of sliders in a second direction along the one dimension causes the corresponding face of the first pair of faces to move in a second direction opposite the first direction along the first dimension of the proposed bounding box.

17. The non-transitory computer-readable medium of claim 16, wherein a speed at which the corresponding face moves is controlled by a distance that the handle of the slider is dragged along the first direction.

18. A non-transitory computer-readable medium storing instructions that, when executed by a processor, cause the processor to:

receive a three-dimensional representation of a scene captured by a depth reconstruction system;

segment a plurality of points from the three-dimensional representation of the scene, the plurality of points corresponding to an object in the scene;

compute a proposed bounding box around the plurality of points;

display the proposed bounding box in a user interface and a plurality of controls configured to adjust locations of corresponding faces of the proposed bounding box, the user interface controls being displayed separately from the proposed bounding box;

receive an input through a control of the plurality of controls to adjust a position of a corresponding face of the proposed bounding box;

display the proposed bounding box with the position of the corresponding face of the proposed bounding box adjusted in accordance with the input; and display dimensions of the proposed bounding box in the user interface, wherein the controls comprise:

a first pair of scrolling controls configured to control a first pair of faces at opposite ends of a first dimension of the proposed bounding box;

a second pair of scrolling controls configured to control a second pair of faces at opposite ends of a second dimension of the proposed bounding box; and a third pair of scrolling controls configured to control a third pair of faces at opposite ends of a third dimension of the proposed bounding box, wherein scrolling a first scrolling control of the first pair of scrolling controls causes a corresponding face of the first pair of faces to move in a direction corresponding to a direction of the scrolling.

* * * * *